Patented Nov. 16, 1948

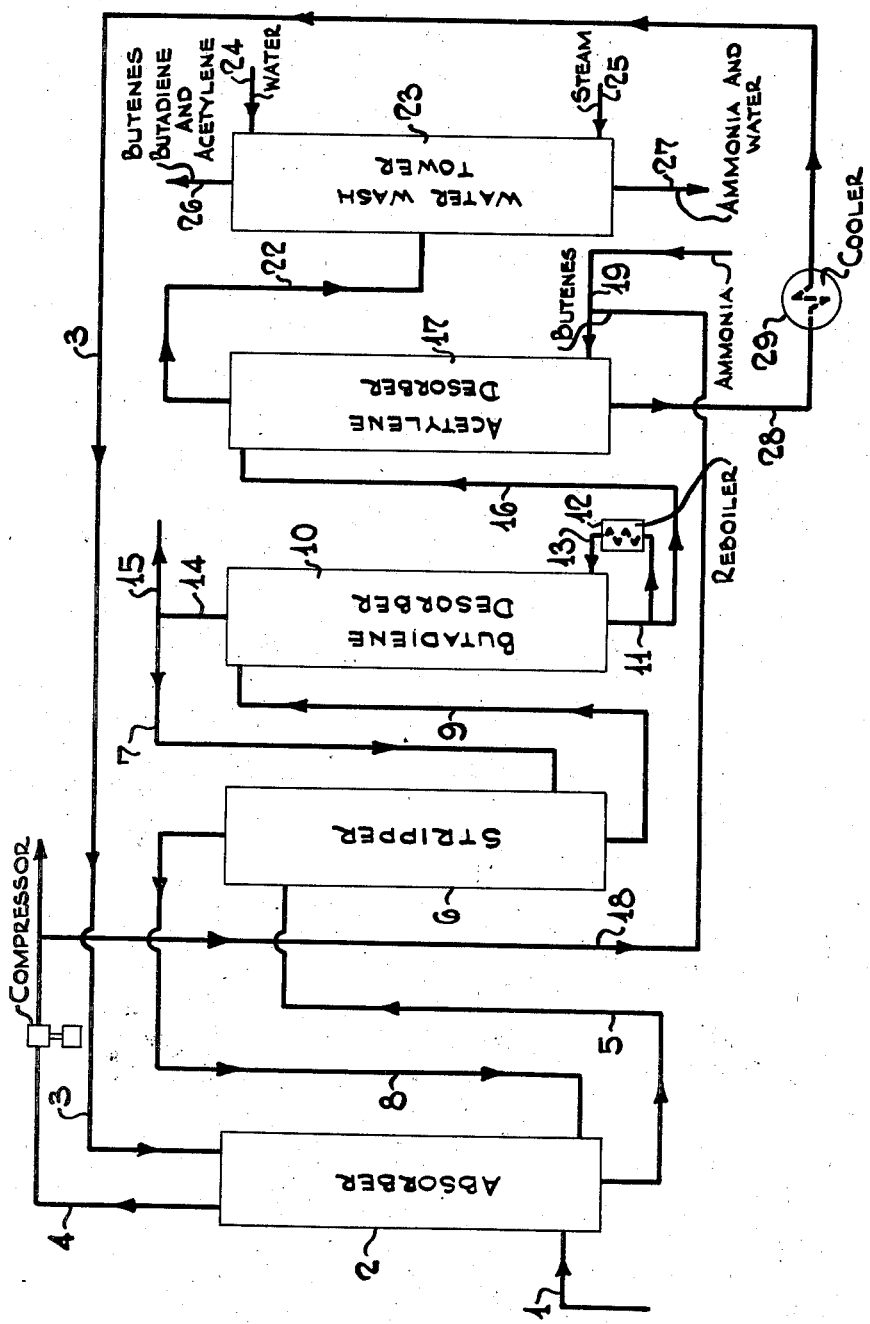

2,453,853

UNITED STATES PATENT OFFICE 2,453,853

SEPARATING HYDROCARBONS

Charles E. Morrell, Westfield, and Miller W. Swaney, Cranford, N. J., assignors to Standard Oil Development Company, a corporation of Delaware Application December 28, 1944, Serial No. 570,194

3 Claims. (Cl. 260—681.5)

This invention relates to improvements in the separation of butadiene from hydrocarbon mixtures and is a continuation-in-part of application Serial No. 459,758, now Patent No. 2,388,928, filed September 26, 1942.

In the extraction of alkyl-acetylene-containing and 1,3-butadiene-containing mixtures of hydrocarbons, having 4 carbon atoms to the molecule and hereafter identified as $C_4$ cuts, with cuprous salt solutions of the basic type, for example, ammoniacal cuprous acetate solutions, both of the above-mentioned types of hydrocarbon unsaturates are dissolved in the copper phase at the low temperature of extraction (e. g. 5° to 50° F.). The acetylenes are held more firmly in the solution than any of the other hydrocarbons in the $C_4$ cut and the butadiene is next most soluble. The allenes, especially butadiene 1,2 are held more firmly than the butadiene 1,3 and are desorbed with the acetylenes. Thus a solution can be prepared which contains substantially only butadiene and acetylenes. When this solution is heated to desorb the butadiene product at say 180° F., alkyl acetylenes (R—C≡CH) or R—C≡C—R are also evolved. Thus is obtained a butadiene product which may contain several thousand parts per million (or up to several-fold the acetylene content of the $C_4$ cut extracted) of these acetylenes. Since these impurities tend to affect or impair the reaction qualities of the butadiene product, it is very desirable to produce butadiene substantially free of these acetylenes.

It has been suggested that the acetylenes be removed by soaking the copper solvent for a period of about one hour at 160° F., whereby the acetylenes are polymerized. However, it has been found that although vinyl acetylene is relatively easy to polymerize, ethyl acetylene and dimethyl acetylene undergo this reaction much less readily. It has been further found that some of the polymers which are thus formed and which remain in the copper solvent are excellent emulsifying and foaming agents, which cause the copper solution to emulsify in the subsequent absorption, stripping, and desorption operations.

It has also been suggested that the acetylenes may be removed in the monomeric state by withdrawing a vapor sidestream from the bottom of the desorber tower. In order to use this method, however, it is desirable to heat the lean solvent to temperatures in the range of 175° to 190° F. in order to supply sufficient stripping vapors, i. e., ammonia and water to strip out the acetylenes. However, when copper ammonium acetate solutions are heated to temperatures much above 190° F. they have a tendency to decompose and precipitate copper oxide due to loss of ammonia from the solution but decomposition may also occur without any ammonia loss after the solution has been heated to a sufficiently high temperature. These higher temperatures also accelerate the polymerization of acetylene. In addition, the withdrawal of an acetylene vapor sidestream has the disadvantage that the amount of ammonia vaporized from the solution and removed along with the sidestream may be excessive, resulting in not only copper oxide precipitation from the solution, but necessitating very high installation and operating costs for ammonia recovery equipment. Finally, the high temperatures required for the sidestream desorption may effect sufficient polymerization of the acetylenes as to produce foaming or emulsifying agents which may prevent the successful operation of the entire butadiene recovery system.

It is, therefore, the main object of this invention to provide a process for separating acetylenes in the monomeric state from butadiene under such conditions that the copper ammonium acetate solution is not decomposed.

It is a further object of this invention to provide a process for separating acetylenes from butadiene in which the amount of ammonia liberated from the copper solution is relatively small.

It is still a further object of this invention to reduce the polymerization of acetylenes to a minimum.

These and other objects of this invention are attained through the use of a continuously operating countercurrent extraction system involving a low temperature (e. g. 0° to 70° F.) absorption system, a butene-stripping system, likewise operated at a slightly higher temperature (40° to 100° F.), a countercurrent operated butadiene desorption unit (e. g. a tower with 70° to 100° F. top temperature and 140° to 180° F. bottom temperature) and finally a low temperature (140° to 180° F.) acetylene stripping system. The absorption and stripping systems may be operated with the hydrocarbon in either vapor or liquid phase.

Other objects and a fuller understanding of this invention may be had by referring to the following description and claims taken in conjunction with the accompanying drawing, which illustrates diagrammatically one method of vapor phase operation according to this invention.

Referring to the drawing, numeral 1 denotes a pipe through which is passed a vaporized $C_4$ cut containing butadiene, acetylenes, butenes, allenes, etc. This mixture is passed through pipe 1 into absorber 2 where a temperature of about 0° to 70° F., preferably 20° to 40° F. is maintained. The hydrocarbon vapor mixture in absorber 2 passes in countercurrent flow to an ammoniacal cuprous acetate solution introduced by pipe 3. A suitable solution comprises 3.2 mols per liter of copper of which the cuprous content is 3.0 molar, the cupric content 0.2 molar and the total ammonia 10.5 to 11.0 molar, acetic acid 4 molar and the balance water.

The unabsorbed gases consisting in large part of butene are removed through pipe 4 and subjected to further treatment as described below. The ammoniacal cuprous acetate solution with butadiene and acetylenes in solution is passed through pipe 5 into stripper 6 which is maintained at temperatures ranging from 40° to 100° F., preferably from 60° to 70° F. The ammoniacal cuprous acetate solution flows downwardly through stripper 6 in countercurrent flow to recycled butadiene introduced by means of pipe 7 and the butene-butadiene mixture resulting from the stripper action of butadiene is returned to absorber 2 by means of pipe 8. The ammoniacal cuprous acetate solution with butadiene, acetylenes and other absorbed gases such as allenes, is passed through pipe 9 and introduced into desorber 10 at a temperature ranging from about 70° to 100° F. (preferably 80° to 90° F.). Ammoniacal cuprous acetate solution flowing into this tower is passed downward through pipe 11 to the reboiler 12 and is circulated by means of pipe 13, whereby the lower part of the tower is maintained at a temperature of about 140° to 180° F. preferably 155° to 170° F. The butadiene product, which may contain some ammonia, is removed through pipe 14, part of the butadiene being recycled through pipe 7 to the bottom of butene stripper 6. The butadiene product is passed to a water scrubber (not shown) to remove ammonia. The remaining part of the ammoniacal cuprous acetate solution removed from the lower part of the desorber 10 by means of pipe 11 and containing acetylenes but substantially free of butadiene, is passed through pipe 16 and introduced to the upper part of the acetylene stripper 17 which is maintained at a temperature ranging between 140° and 180° F., preferably 155° to 170° F.

Acetylenes and allenes are recovered by introducing an inert gas into the bottom of stripper 17 through line 18. This inert gas may be any type of inert gas but is preferably a portion of the spent butenes removed from the top of tower 2. According to this invention, therefore, a portion of the spent butenes removed from tower 2 through line 4 are compressed and passed by line 18 to the bottom of tower 17 where they are introduced along with ammonia introduced through line 19 and effectively strip acetylenes and allenes from the lean solvent introduced through line 16. These acetylenes and allenes plus small amounts of butadiene and larger quantities of ammonia and water are removed through pipe 22 and are passed to the mid-point of wash tower 23 where they are contacted with water introduced through line 24 and steam through line 25 for the purpose of ammonia removal. The water introduced through line 24 is preferably steam condensate so as to avoid corrosion by deposited salts. Acetylene-containing hydrocarbons are removed from tower 23 through line 26 and aqueous ammonia through line 27. The ammoniacal cuprous acetate solution from tower 17 is passed through pipe 28, cooler 29 and pipe 3 to absorber 2. Pressures ranging from 0 to 25 pounds per square inch gauge may be maintained throughout the whole system but the invention is not limited to this range of pressures.

From the above description it is evident that a process for separating undesirable acetylenes from butadiene has been described which is advantageous over prior processes in that the copper solution is not subjected to temperatures in excess of 180° F. and because of the lower temperatures the amount of ammonia liberated from the copper solution is relatively small. Also, the amount of acetylenes polymerized is held to a minimum reducing the foaming and emulsifying tendency of the solution.

Cuprous solutions containing amines other than ammonia may be used, for example, those cuprous solutions containing pyridine, methyl amine, dimethyl amine and ethyl amine.

Although the present invention has been described with a certain degree of particularity, it is to be understood that the present disclosure has been made only by way of illustration and that numerous changes in the details of construction and the combination and arrangement of parts may be resorted to without departing from the spirit and scope of the invention as hereinafter claimed.

The nature and objects of the present invention having thus been set forth and a specific illustration of the same given, what is claimed as new and useful and desired to be secured by Letters Patent is:

1. Process of separating and segregating butadiene from a mixture of hydrocarbons containing butadiene and acetylenes which comprises absorbing the acetylenes and the butadiene from the said hydrocarbon mixture by contacting with an ammoniacal cuprous salt solution in which the ammonia is maintained at a high enough concentration to maintain the copper acetylides formed in dissolved form, separating copper solution from unabsorbed hydrocarbons, heating the cuprous salt solution to a temperature range of from 40° to 100° F. to release absorbed butenes, further heating the cuprous salt solution to a temperature ranging from 140° to 170° F. while maintaining a reflux temperature ranging from 70° to 100° F., so that only butadiene will be desorbed, then separately subjecting the resulting cuprous salt solution substantially free of butadiene at temperatures ranging from 140° to 180° F. to the stripping action of said unabsorbed hydrocarbons, to remove acetylenes.

2. Process of separating and segregating butadiene which comprises contacting a hydrocarbon mixture containing butadiene and acetylenes at a temperature ranging from 20° to 40° F. with a cuprous salt solution, heating the said cuprous salt solution after it has been separated from the unabsorbed hydrocarbon mixture to a temperature ranging from 60° to 70° F. to remove any dissolved butenes, heating the remaining cuprous salt solution free of butenes to a temperature ranging from 140° to 180° F. to desorb butadiene and submitting the overhead distillate to a reflux action by maintaining the temperature of the gases expelled between 70° and 100° F., to hold acetylenes in said cuprous salt solution and then separately subjecting the cuprous salt solution at 140° to 180° F. to the stripping action of the separated unabsorbed hydrocarbons to separately remove acetylenes.

3. Process of separating and segregating butadiene which comprises contacting a hydrocarbon mixture containing butadiene and acetylenes at a temperature ranging from 20° to 40° F. with an aqueous solution containing 3 mols per liter of cuprous complex, 4 mols per liter acetate and 10.5 to 11 mols per liter of total ammonia, heating the said cuprous salt solution after it has been separated from the unabsorbed hydrocarbon mixture to a temperature ranging from 60° to 70° F. to release dissolved butenes, heating the remaining cuprous salt solution free of butenes to a temperature ranging from 155° to 170° F. and submitting the overhead distillate to a reflux action by maintaining the temperature of the gases expelled between 70° and 100° F., removing a bottom fraction substantially free of butadiene and stripping the bottom fraction with the unabsorbed hydrocarbons separated in the process to release acetylenes at a temperature within the range of 140°–180° F.

CHARLES E. MORRELL.
MILLER W. SWANEY.

REFERENCES CITED

The following references are of record in the file of this patent:

UNITED STATES PATENTS

| Number | Name | Date |
|---|---|---|
| 2,336,643 | Schulze | Dec. 14, 1943 |
| 2,369,559 | Gilliland | Feb. 13, 1945 |
| 2,386,274 | Short et al. | Oct. 9, 1945 |
| 2,386,352 | Schulze | Oct. 9, 1945 |
| 2,386,360 | Short | Oct. 9, 1945 |
| 2,388,928 | Morrell et al. | Nov. 13, 1945 |